United States Patent
Barber et al.

(10) Patent No.: US 6,535,906 B1
(45) Date of Patent: Mar. 18, 2003

(54) SYSTEM FOR CONTROLLING THE EFFECT OF TRANSMITTING A DOCUMENT ACROSS A PACKET BASED NETWORK

(75) Inventors: Larry R. Barber, Montgomery Village, MD (US); Michael Z. Livchitz, Rockville, MD (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/361,540

(22) Filed: Jul. 27, 1999

(51) Int. Cl.[7] .............................. G06F 13/00; H04N 1/00
(52) U.S. Cl. ........................ 709/200; 358/434; 358/468
(58) Field of Search ................................ 709/200, 201, 709/203, 217, 218, 219; 358/402, 412, 425, 434, 468

(56) References Cited

U.S. PATENT DOCUMENTS 5,691,820 A * 11/1997 Komatsu .................... 358/434
6,285,466 B1 * 9/2001 Chimura et al. ............. 358/434
6,335,803 B1 * 1/2002 Chimura et al. ............. 358/434

* cited by examiner

Primary Examiner—Moustafa M. Meky
(74) Attorney, Agent, or Firm—John C. Gorecki

(57) ABSTRACT

A method and apparatus for transmitting a document across a network from a transmitting device to a receiving device reconstructs the document and stores the reconstructed document in a buffer. Specifically, the document is received from a packet based portion of the network as data packets. Data lines that comprise the document then are reconstructed from the received document data packets. The reconstructed data lines then are stored in the buffer, and retrieved at a substantially constant rate from the buffer as necessary. The reconstructed data lines then are transmitted to the receiving device across the network at about the substantially constant rate. The document then is transmitted from the transmitting device at the substantially constant rate.

75 Claims, 4 Drawing Sheets

SYSTEM FOR CONTROLLING THE EFFECT OF TRANSMITTING A DOCUMENT ACROSS A PACKET BASED NETWORK

FIELD OF THE INVENTION

The invention generally relates to networks and, more particularly, the invention relates to reducing the effect of delay on a transmitted document.

BACKGROUND OF THE INVENTION

Due to increasing telephone usage charges, it has become increasingly common for facsimile documents to be transmitted (i.e., "faxed") from a sending facsimile machine ("fax machine") to a receiving fax machine via the Internet. Since fax documents are transmitted and received at a preselected, substantially constant rate (e.g., 28.8 kilobytes per second), use of the Internet for faxing documents introduces data delays that can corrupt the document data received by the receiving fax machine.

The art has responded to this problem by buffering data packets utilized to transport a faxed document across the Internet. This data is stored in no specific manner relative to the format of the actual document. Once in a buffer, the packets can be retrieved and forwarded to the receiving fax at a more consistent data rate. Problems arise with this solution, however, when the buffer is full. More particularly, when the buffer is full, incoming data packets can be dropped, thus requiring retransmission of the entire document. In a similar manner, problems also can arise when too few packets are in the buffer (i.e., many of the data packets transporting the document may have been delayed within the Internet and, consequently, not yet received by the buffer). Specifically, the buffer may not have enough data to transmit to the receiving fax at a given preselected data rate required by a given transmission. Accordingly, since the receiving fax is configured to receive the document data at the given preselected rate, then receipt of such data at a slower data rate can corrupt the faxed document.

SUMMARY OF THE INVENTION

In accordance with one aspect of the invention, a method and apparatus for transmitting a document across a network from a transmitting device to a receiving device reconstructs the document and stores the reconstructed document in a buffer. Specifically, the document is received from a packet based portion of the network as data packets. Data lines that comprise the document then are reconstructed from the received document data packets. The reconstructed data lines then are stored in the buffer, and retrieved at a substantially constant rate from the buffer as necessary. The reconstructed data lines then are transmitted to the receiving device across the network at about the substantially constant rate. In preferred embodiments, the document is transmitted from the transmitting device at the substantially constant rate.

In some embodiments, the receiving device is configured to receive the document at the substantially constant rate. The transmitting device and receiving device may be facsimile machines. The reconstructed lines may be transmitted to the receiving device via a public telephone network. The buffer may be coupled to a gateway that translates data between a packet based format and an analog format. The data lines may comprise scan lines of a facsimile document.

It may be determined if the total amount of data in the buffer is less than a minimum amount of data. If so, then additional data may be added to at least one reconstructed data line prior to transmitting it toward the receiving device. Conversely, instead of adding such additional data, at least one of the data lines in the buffer may be copied to produce at least one copied data line that can be transmitted to the receiving device. If the total amount of data in the buffer is greater than a maximum amount of data, then at least one data line may be deleted from the buffer prior to transmission to the receiving device, thus freeing memory in the buffer. The deleted data lines may be a preselected pattern of data lines. In other embodiments, data lines retrieved from the buffer may be converted into an analog data line signal that is transmitted along an analog portion of the network.

In accord with another aspect of the invention, an apparatus and method of controlling the effect of delay on a document transmitted across a network also stores data representing the document in a buffer. To that end, the document is received as document data packets from a packet based portion of the network, and then stored in the buffer. The total amount of data is monitored in the buffer to determine if the total amount of such data is less than a minimum amount of data. If below such minimum, then document data is transmitted across the network toward a receiving device. The transmitted document data includes the document and additional data associated with data lines of the document.

In accord with other aspects of the invention, an apparatus and method of controlling the effect of delay on a document transmitted across a network also buffers the document data. Specifically, document data packets utilized to transport the document are received from a packet based portion of the network, and then stored in the buffer. The stored data is changed in the buffer to produce changed document data if the total amount of data stored in the buffer is outside a preselected size range having maximum and minimum sizes. The changed document data is transmitted across the network toward a receiving network device.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

In accord with preferred embodiments of the invention, delay, jitter, and other undesirable data transmission effects introduced to a transmitted document by a packet based network are minimized by reconstructing and storing portions of the reconstructed document in an intermediate buffer. Once stored in the buffer, portions of the reconstructed document can be forwarded to a receiving device in a prescribed manner that reduces the effect of the delay on the document. Details of this prescribed manner are discussed below.

Figure 1:
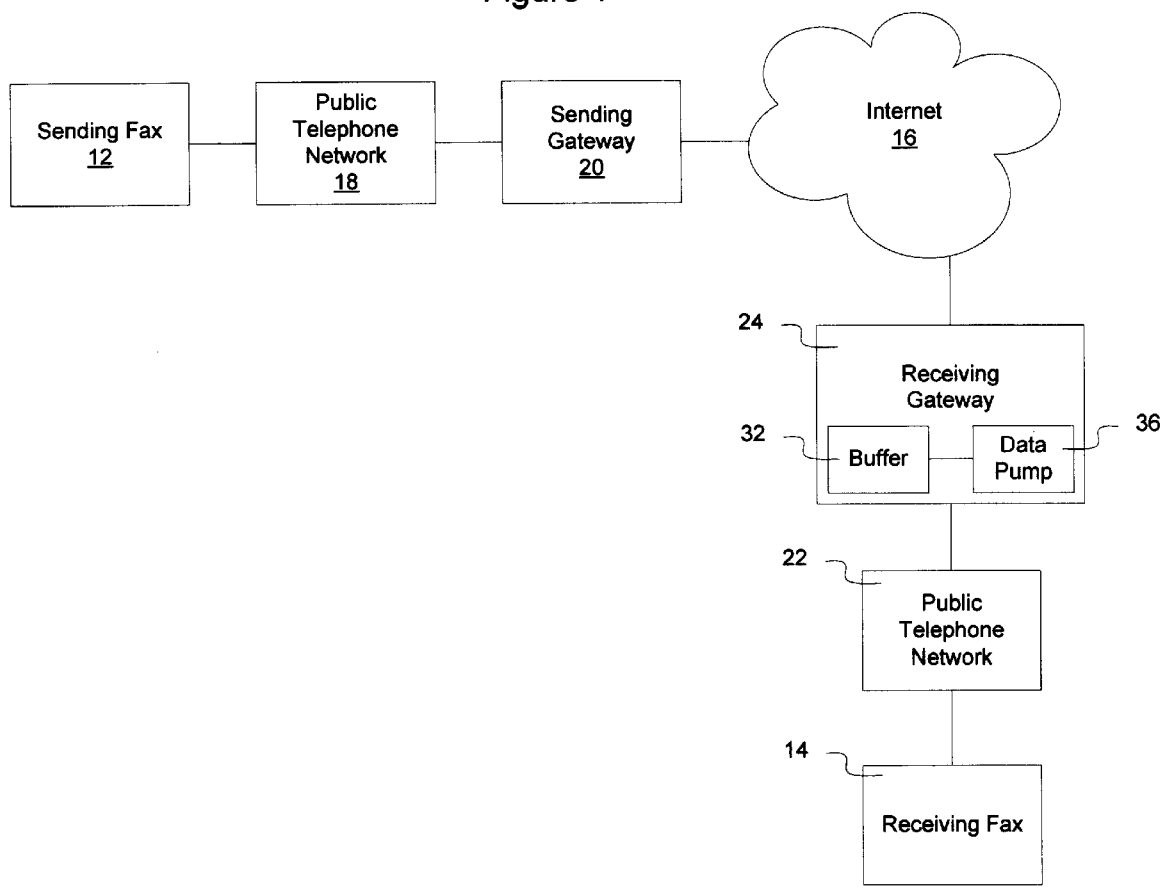
FIG. 1 schematically shows an exemplary network arrangement that may be utilized to transmit facsimile documents across a network in accord with preferred embodiments of the invention.

FIG. 1 schematically shows an exemplary network arrangement ("network 10") that may be utilized to transmit facsimile documents ("fax documents") in accord with preferred embodiments of the invention. As known in the art, fax documents include a plurality of scan lines that are transmitted at a substantially constant rate (e.g., 28.8 kilobytes per second) to a receiving facsimile machine. It should be noted that although fax documents are described, principles of the invention apply to other types of documents that may be transmitted across a network 10 that includes a packet based portion.

The network 10 shown in FIG. 1 includes a sending facsimile machine ("sending fax machine 12") that generates fax documents in accord with well known standards (e.g., the well known and widely used T.4 and T.30 protocols, specified by International Telecommunications Union, also known as the "ITU") for receipt by a receiving facsimile machine ("receiving fax machine 14") across the Internet 16. Accordingly, the sending fax machine 12 is coupled with a first portion of a public telephone network 18 (e.g., a public switched telephone network) that utilizes a sending gateway 20 to communicate with the Internet 16. In a similar manner, the receiving fax machine 14 also is coupled to a second portion of the public telephone network 22 that similarly utilizes a receiving gateway 24 to communicate with the Internet 16.

The sending and receiving gateways 20 and 24 may be any conventionally known gateway, such as the V/IP Phone/Fax IP™ Gateway, available from Nortel Networks Corporation of Montreal, Quebec, Canada. In preferred embodiments, however, the receiving gateway 24 is specially configured with additional elements (shown in FIG. 2) that implement the various processes (discussed below) for reducing the effect of delay on a transmitted facsimile document. In alternative embodiments, an external module coupled to the gateway may implement the various described processes. The fax machines may be any conventionally known type of fax machine, such as the FaxCentre Pro-745 Fax™ fax machine, available from Xerox Corporation of Stamford, Conn.

Figure 2:
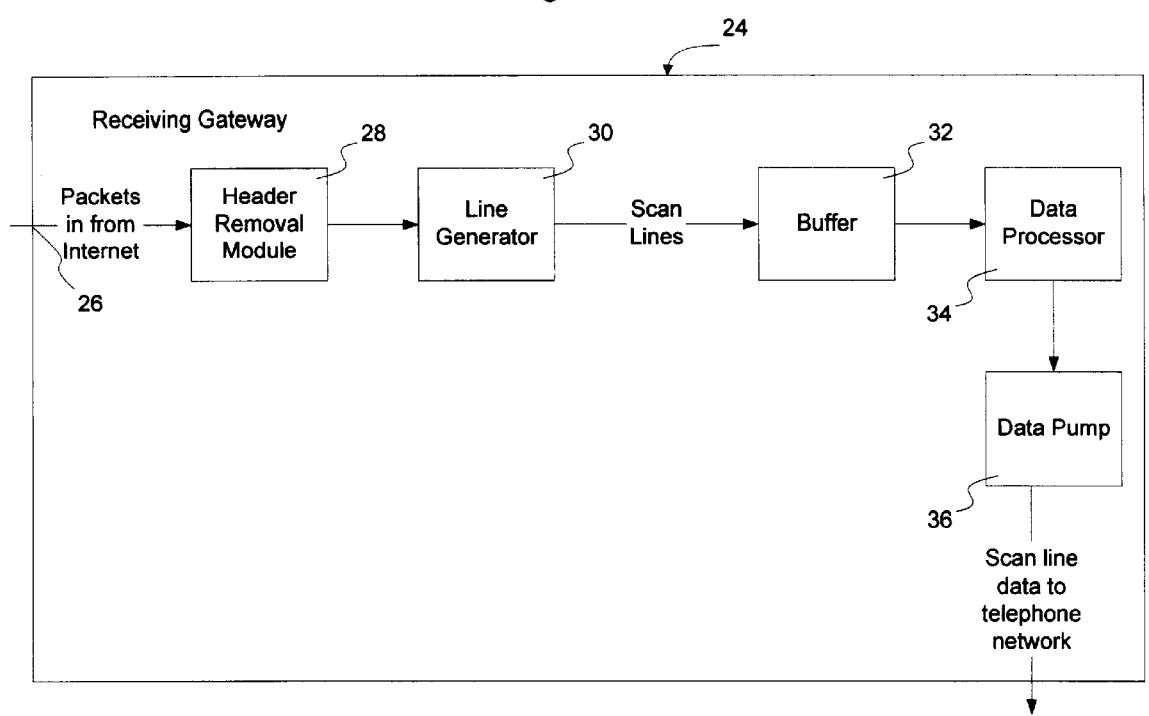
FIG. 2 schematically shows additional details of a receiving gateway constructed in accord with preferred embodiments of the invention.

FIG. 2 schematically shows additional details of the receiving gateway 24 as constructed in accord with preferred embodiments of the invention. Document data, which is received at an input 26 that is coupled to the Internet 16, may be in the form of data packets that each include a data header and accompanying payload (i.e., the document data). Accordingly, the receiving gateway 24 includes a header removal module 28 that removes the header from each data packet, a line generator 30 that generates scan lines from the document data that remains after the headers are removed from packets, and a buffer 32 for storing the generated scan lines. In preferred embodiments, the scan lines are generated in accord with conventional processes utilized by the T.4 protocol, and the buffer 32 can store about four kilobytes of data.

The receiving gateway 24 also includes a data processor 34 that monitors the total amount of data in the buffer 32, and processes the buffer data if the total amount of data in the buffer 32 is outside a preconfigured range. Such range may be between a maximum and minimum amount of data, such as between about 0.5 and 3.5 kilobytes. In preferred embodiments, this range may be easily reconfigured by a reconfiguration manager application (not shown) or other conventional means. The data processor 34 also is coupled with a data pump 36 that forwards document data from the buffer 32 (and the data processor 34) to the second portion of the public telephone network 22 at a prescribed data rate (e.g., 28.8 kilobytes per second). As known in the art, the constant prescribed data rate is one that is negotiated prior to transmission of document data from the transmitting fax machine. This prescribed rate thus is forwarded to the data pump 36 for each respective fax document transmission. In addition to the elements shown in FIG. 2, the gateway includes many other well known components commonly included in conventionally used gateways, such as processors, memory, disk drives, busses, etc . . . In preferred embodiments, the sending gateway 20 also may be configured as shown in FIG. 2 so that fax documents may be received by the transmitting fax machine during some other transmission.

Figure 3:
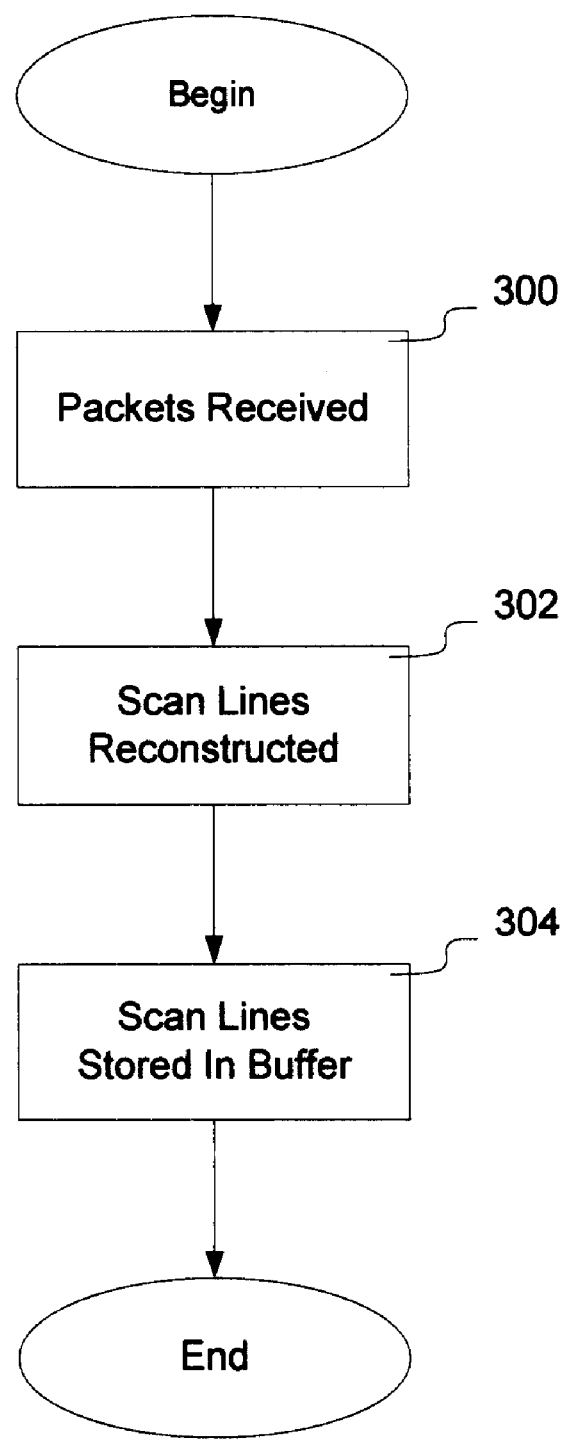
FIG. 3 shows a preferred process utilized to store document data in the buffer shown in FIG. 2.

FIG. 3 shows a preferred process of storing document data in the buffer 32. The process begins at step 300 in which data packets having the document data are received at the input 26 of the gateway. As suggested above and known by those skilled in the art, document data for a fax document includes a plurality of scan lines that each represent a line of the document being faxed. Each scan line thus includes a plurality of bits that are followed by an end of scan line indicator ("end of scan line marker"). The data packets thus comprise header data and scan line data for the document. Each packet may include a different amount of scan line data that does not necessarily include a complete scan line. In fact, each data packet may include any number of complete or incomplete scan lines.

The process thus continues to step 302 in which the scan lines are reconstructed. To that end, the header removal module 28 removes all header data from the received data packets, and forwards the scan line data to the line generator 30. The line generator 30 consequently locates the beginning and end of each scan line, thus reconstructing the scan lines of the document. In preferred embodiments, the line generator 30 executes well known line reconstruction processes utilized by the T.4 protocol. Once regenerated, each scan line is stored in the buffer 32 (step 304), thus ending the process. Accordingly, in summary, this process shown in FIG. 3 extracts document data from received data packets, regenerates scan lines from the document data, and then stores the regenerated scan lines in the buffer 32. The regenerated scan lines are maintained in a manner similar to that used for storing scan lines at the receiving fax machine 14 (as specified by the T.4 protocol).

Figure 4:
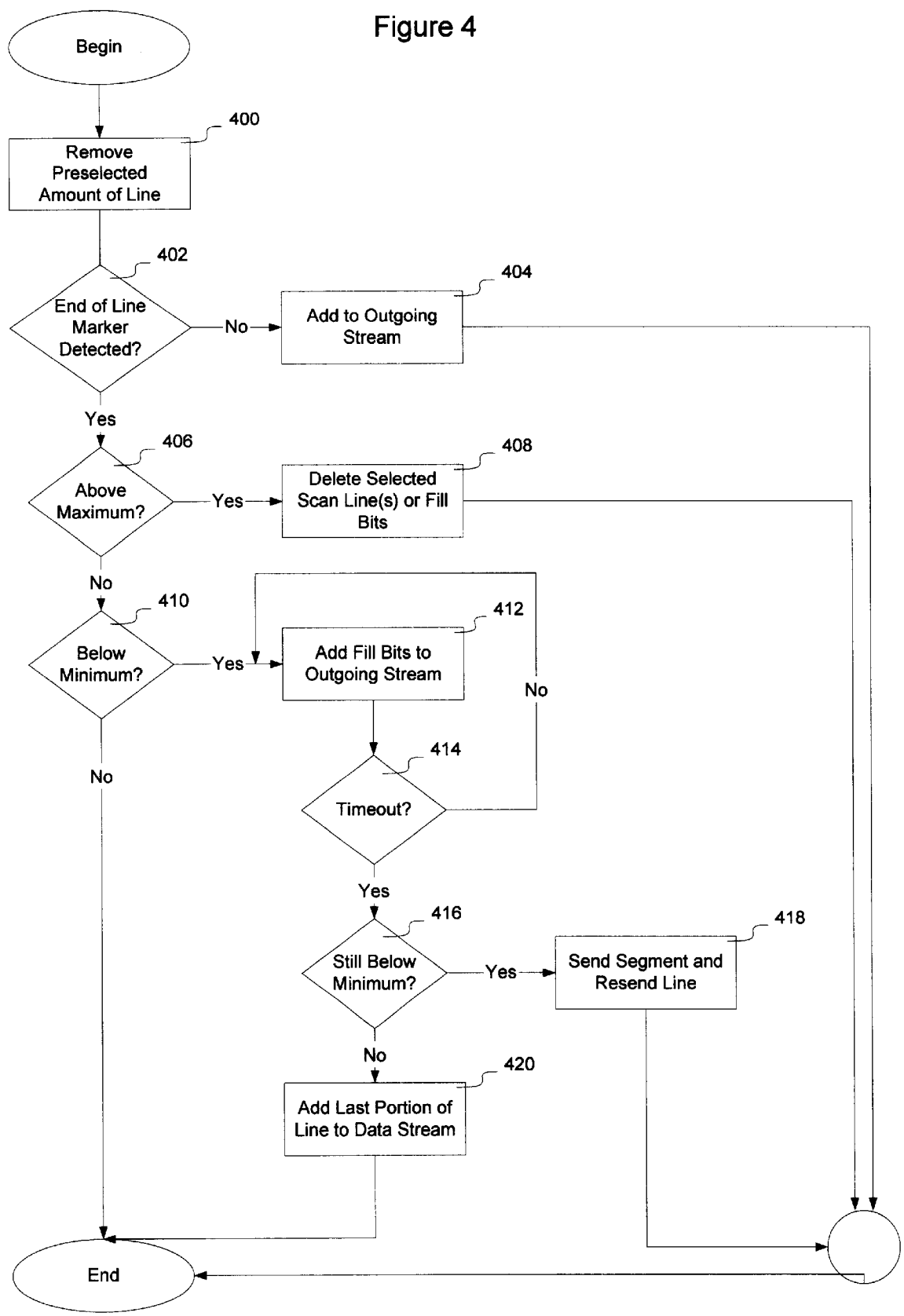
FIG. 4 shows a preferred process of forwarding data from the buffer shown in FIGS. 1 and 2 to a receiving fax machine.

FIG. 4 shows a preferred process of removing document data from the buffer 32 for transmitting an entire document to the receiving fax machine 14. This process repeats until the entire document is transmitted to the receiving fax machine 14. The process begins at step 400 in which a preselected amount of a given scan line ("line segment") is removed from the buffer 32 by the data processor 34. The size of the line segment and frequency of data removal from the buffer 32 is selected to ensure that a preselected data rate (e.g., 28.8 BPS) can be maintained by the data pump 36. For example, a set number of bytes may be removed during each data removal cycle.

Once the line segment is removed, the process then continues to step 402 in which it is determined if an end of line marker is detected in the line segment. If no such marker is detected, then the process continues to step 404 in which the line segment is added to an outgoing data stream that is transmitted to the receiving fax machine 14 by the data pump 36. As known in the art, the outgoing data stream preferably utilizes analog transmission signals since it is transmitted via the public telephone network 18.

Returning to step 402, if it is determined that an end of line marker is within the line segment, then the process continues to determine if the total amount of data in the buffer 32 is within a preselected size range. If not within this range, then data in the outgoing data stream is altered to minimize the effects of the overfilled or underfilled buffer 32. Specifically, if an end of line marker is detected (at step 402), then the process continues to step 406 in which it is determined if the total amount of data within the buffer 32 is greater than a preconfigured maximum value.

If greater than the preconfigured maximum value, then the process continues to step 408 in which selected scan line(s) are deleted from the buffer 32. For example, the next scan line (after the end of line marker of the given scan line) may be dropped. To that end, a pointer in the buffer 32 that points to the next scan line merely is incremented to the next succeeding scan line in the buffer 32. The memory location of the next scan line thus can be overwritten with additional document data (i.e., another scan line) as it is received from the Internet 16. The line segment under examination then may be added to the outgoing data stream, thus completing transmission of the entire given scan line.

In some embodiments, if it is determined at step 406 that the total amount of data in the buffer 32 is greater than the maximum value, then more than one scan line is deleted from the buffer 32. For example, every tenth scan line may be removed, thus freeing ten percent of the buffer 32 for receiving additional scan lines. Conventional methods of locating and deleting such scan lines may be utilized. Accordingly, patterns of scan lines may be removed as specified by the data processor 34. In preferred embodiments, however, no more than one consecutive scan line in a single fax document is dropped, thus ensuring that the resultant error of the document as received by the receiving fax machine 14 does not have two consecutively omitted scan lines. In other embodiments, arbitrary scan lines are deleted from the buffer 32. Although it is preferred that no two contiguous scan lines be removed, some embodiments may delete two or more contiguous scan lines.

Instead of, or in addition to, deleting selected scan lines, alternative embodiments include logic for deleting fill bits within one or more line segments in the buffer 32. These fill bits were those that were added by the sending fax machine 12 prior to its transmission to the buffer 32 across the Internet 16. Accordingly, deleting these fill bits can reduce the amount of data in the buffer 32 to a level that is below the preconfigured maximum value.

Returning to step 406, if it is determined that the total amount of data in the buffer 32 is not above the maximum value, then it is determined at step 410 if the total amount of data in the buffer 32 is below a preconfigured minimum value. If not below the minimum value, then the total amount of data in the buffer 32 is deemed to be within the preconfigured size range, thus ending the process.

Conversely, if the total amount of data is determined at step 410 to be below the minimum value, then the process continues to step 412 in which fill bits (i.e., "0" slip bit values in a fill region that is prior to the end of line marker of the removed scan line) are added to the outgoing data stream. The extra time required to add these fill bits thus is utilized to permit new scan lines to be received by the buffer 32 via the Internet 16. It then is determined at step 414 if a timeout has occurred (as prescribed by the T.30 protocol). If no timeout has occurred, then the process loops back to step 412 in which further fill bits are added to the outgoing data stream. When a timeout is detected at step 414, however, then the process continues to step 416 in which it is determined if the total amount of data in the buffer is still below the minimum value.

If still below the minimum, then the process continues to step 418 in which the line segment is added to the data stream, and the scan line is re-sent to the receiving fax machine 14. To that end, pointers in the buffer are set to point to the beginning of the given scan line in the buffer 32. The entire process shown in FIG. 4 thus repeats as necessary to send that scan line. In some embodiments, an indefinite number of copies can be transmitted until the total amount of data in the buffer 32 is greater than the minimum value. In other embodiments, only one additional copy of each removed scan line is transmitted (in addition to the original of each scan line) until the total amount of data in the buffer 32 is greater than the minimum value. Each transmitted copy can include scan lines with or without fill bits.

Returning to step 416, if it is determined that the buffer 32 is no longer below the minimum, then the process continues to step 420 in which the last portion of the scan line is added to the outgoing data stream. Once added to the outgoing data stream, then the process ends. This process then may be repeated for the next scan line if additional scan lines still are in the buffer 32.

It should be noted that order of the various steps of the described processes can vary. For example, if the order of steps 406 and 410 are swapped, then the process should still produce the same results.

Accordingly, preferred embodiments utilize a controlled method of adding error into a document transmitted to the receiving fax machine 14. This controlled method should reduce well known "undefined errors" that corrupt the ultimate copy of the faxed document received by the receiving fax machine 14, thus substantially preserving the integrity of such document. Of course, this added error often is necessary due to delay commonly inherent in the Internet 16. As noted above, this added error generally would be unnecessary if the such delay were eliminated. Moreover, in preferred embodiments, the gateway acts as a virtual transmitting fax machine by transmitting document data at the required constant data rate to the receiving fax machine 14 via the second portion of the public telephone network 22. Some embodiments of the invention also may be applied to other multimedia transmissions, such as video or audio transmitted over the Internet (i.e., a packet based network).

Preferred embodiments of the invention (e.g., the line generator 30, header removal module 28, data processor 34, and data pump 36) may be implemented in any conventional computer programming language. For example, preferred embodiments may be implemented in a procedural programming language (e.g., "C") or an object oriented programming language (e.g., "C++" or "JAVA"). Alternative embodiments of the invention may be implemented as preprogrammed hardware elements (e.g., application specific integrated circuits or digital signal processors), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet 16 or World Wide Web).

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

We claim:

1. A method of transmitting a document across a network from a transmitting device toward a receiving device, the network having a packet based portion that transmits the document as document data packets, the document having a plurality of data lines and being transmitted from the transmitting device at a substantially constant rate, the method comprising:

receiving the document data packets from the packet based portion of the network;

reconstructing the data lines of the document from the received document data packets;

storing the reconstructed data lines in a buffer;

retrieving, at about the substantially constant rate, the reconstructed data lines; and transmitting the reconstructed data lines to the receiving device across the network at about the substantially constant rate.

2. The method as defined by claim 1 wherein the receiving device is configured to receive the document at the substantially constant rate.

3. The method as defined by claim 2 wherein the transmitting device and receiving device arc facsimile machines.

4. The method as defined by claim 1 wherein the act of transmitting comprises:

transmitting the reconstructed lines to the receiving device via a public telephone network.

5. The method as defined by claim 1 wherein the buffer is coupled to a gateway that translates data between a packet based format and an analog format.

6. The method as defined by claim 1 wherein the data lines comprise scan lines of a facsimile document.

7. The method as defined by claim 1 further comprising:

determining if the total amount of data in the buffer is less than a minimum amount of data;

adding additional data to at least one reconstructed data line if the total amount of data in the buffer is less than the minimum amount; and transmitting the additional data toward the receiving device.

8. The method as defined by claim 1 further comprising:

determining if the total amount of data in the buffer is less than a minimum amount of data; and transmitting at least one data line twice if the total amount of data in the buffer is less than the minimum amount.

9. The method as defined by claim 1 further comprising:

determining if the total amount of data in the buffer is greater than a maximum amount of data; and deleting at least one data line from the buffer prior to transmission to the receiving device if the total amount of data in the buffer is greater than a maximum amount of data, the act of deleting freeing memory in the buffer.

10. The method as defined by claim 9 wherein a preselected pattern of data lines is deleted from the buffer prior to transmission to the receiving device.

11. The method as defined by claim 1 wherein the act of retrieving comprises converting the retrieved data lines into an analog data line signal, the transmitted data lines being the analog data line signal transmitted along an analog portion of the network.

12. An apparatus for transmitting a document across a network from a transmitting device toward a receiving device, the network having a packet based portion that transmits the document as document data packets, the document having a plurality of data lines and being transmitted from the transmitting device at a substantially constant rate, the apparatus comprising:

an input that receives the document data packets from the packet based portion of the network;

a data module operatively coupled with the input the data module reconstructing the data lines of the document from the received document data packets;

a buffer that stores the reconstructed data lines;

a data pump operatively coupled with the buffer, the data pump retrieving, at about the substantially constant rate, the reconstructed data lines; and an output that transmits the reconstructed data lines to the receiving device across the network at about the substantially constant rate.

13. The apparatus as defined by claim 12 wherein the receiving device is configured to receive the document at the substantially constant rate.

14. The apparatus as defined by claim 13 wherein the transmitting device and receiving device are facsimile machines.

15. The apparatus as defined by claim 12 wherein the output is coupled to a public telephone network, the output transmitting the reconstructed lines to the receiving device via a public telephone network.

16. The apparatus as defined by claim 12 further comprising a gateway operatively coupled with the buffer, the gateway translating data between a packet based format and an analog format.

17. The apparatus as defined by claim 12 wherein the data lines comprise scan lines of a facsimile document.

18. The apparatus as defined by claim 12 further comprising:

a data checker that determines if the total amount of data in the buffer is less than a minimum amount of data; and a data adder operatively coupled to the data checker, the data adder adding additional data to at least one reconstructed data line if the total amount of data in the buffer is less than the minimum amount, the additional data being transmitted toward the receiving device.

19. The apparatus as defined by claim 12 further comprising:
a data checker that determines if the total amount of data in the buffer is less than a minimum amount of data,
the output transmitting at least one data line twice if the total amount of data in the buffer is less than the minimum amount.

20. The apparatus as defined by claim 12 further comprising:
a data checker that determines if the total amount of data in the buffer is greater than a maximum amount of data; and
a data processor operatively coupled with the data checker, the data processor deleting at least one data line from the buffer prior to transmission to the receiving device if the total amount of data in the buffer is greater than a maximum amount of data, the act of deleting freeing memory in the buffer.

21. The apparatus as defined by claim 20 wherein a preselected pattern of data lines is deleted from the buffer prior to transmission to the receiving device.

22. The apparatus as defined by claim 12 further including a data converter operatively coupled to the data pump, the data converter converting the retrieved data lines into an analog data line signal, the transmitted data lines being the analog data line signal transmitted along an analog portion of the network.

23. A computer program product for use on a computer system for transmitting a document across a network from a transmitting device toward a receiving device, the network having a packet based portion that transmits the document as document data packets, the document having a plurality of data lines and being transmitted from the transmitting device at a substantially constant rate, the computer program product comprising a computer usable medium having computer readable program code thereon, the computer readable program code including:
program code for receiving the document data packets from the packet based portion of the network;
program code for reconstructing the data lines of the document from the received document data packets;
program code for storing the reconstructed data lines in a buffer;
program code for retrieving, at about the substantially constant rate, the reconstructed data lines; and
program code for transmitting the reconstructed data lines to the receiving device across the network at about the substantially constant rate.

24. The computer program product as defined by claim 23 wherein the receiving device is configured to receive the document at the substantially constant rate.

25. The computer program product as defined by claim 24 wherein the transmitting device and receiving device are facsimile machines.

26. The computer program product as defined by claim 23 wherein the program code for transmitting comprises:
program code for transmitting the reconstructed lines to the receiving device via a public telephone network.

27. The computer program product as defined by claim 23 wherein the buffer is coupled to a gateway that translates data between a packet based format and an analog format.

28. The computer program product as defined by claim 23 wherein the data lines comprise scan lines of a facsimile document.

29. The computer program product as defined by claim 23 further comprising:
program code for determining if the total amount of data in the buffer is less than a minimum amount of data; and
program code for adding additional data to at least one reconstructed data line if the total amount of data in the buffer is less than the minimum amount.

30. The computer program product as defined by claim 23 further comprising:
program code for determining if the total amount of data in the buffer is less than a minimum amount of data; and
program code for transmitting at least one data line twice if the total amount of data in the buffer is less than the minimum amount.

31. The computer program product as defined by claim 23 further comprising:
program code for determining if the total amount of data in the buffer is greater than a maximum amount of data; and
program code for deleting at least one data line from the buffer prior to transmission to the receiving device if the total amount of data in the buffer is greater than a maximum amount of data, the act of deleting freeing memory in the buffer.

32. The computer program product as defined by claim 31 wherein a preselected pattern of data lines is deleted from the buffer prior to transmission to the receiving device.

33. The computer program product as defined by claim 23 wherein the program code for retrieving comprises converting the retrieved data lines into an analog data line signal, the transmitted data lines being the analog data line signal transmitted along an analog portion of the network.

34. A method of controlling the effect of delay on a document transmitted across a network from a transmitting device to a receiving device, the network having a packet based portion that transmits the document as document data packets, the document having a plurality of data lines, the method comprising:
receiving the document data packets from the packet based portion of the network;
storing data representing the document in a buffer;
monitoring the total amount of data in the buffer; and
transmitting document data toward the receiving device across the network, the document data including additional data that is associated with the data lines of the document if the total amount of data in the buffer is less than a minimum amount of data.

35. The method as defined by claim 34 wherein the document is transmitted from the transmitting device at a substantially constant rate, the document data being retrieved from the buffer and transmitted toward the receiving device at the substantially constant rate.

36. The method as defined by claim 34 wherein the additional data comprises a copy of at least one of the data lines of the document.

37. The method as defined by claim 34 wherein the additional data comprises fill data appended at least of the data lines of the document.

38. The method as defined by claim 34 wherein the document is stored in the buffer as data lines.

39. The method as defined by claim 38 wherein the data lines comprise scan lines of a facsimile document.

40. An apparatus for controlling the effect of delay on a document transmitted across a network from a transmitting device to a receiving device, the network having a packet based portion that transmits the document as document data packets, the document having a plurality of data lines, the apparatus comprising:

an input that receives the document data packets from the packet based portion of the network;

a buffer that stores data representing the document;

a monitor operatively coupled with the buffer, the monitor monitoring the total amount of data in the buffer; and an output operatively coupled with the monitor, the output transmitting document data toward the receiving device across the network, the document data including additional data that is associated with the data lines of the document if the total amount of data in the buffer is less than a minimum amount of data.

41. The apparatus as defined by claim 40 wherein the document is transmitted from the transmitting device at a substantially constant rate, the document data being retrieved from the buffer and transmitted toward the receiving device at the substantially constant rate.

42. The apparatus as defined by claim 40 wherein the additional data comprises a copy of at least one of the data lines of the document.

43. The apparatus as defined by claim 40 wherein the additional data comprises fill data appended at least of the data lines of the document.

44. The apparatus as defined by claim 40 wherein the document is stored in the buffer as data lines.

45. The apparatus as defined by claim 44 wherein the data lines comprise scan lines of a facsimile document.

46. A computer program product for use on a computer system for controlling the effect of delay on a document transmitted across a network from a transmitting device to a receiving device, the network having a packet based portion that transmits the document as document data packets, the document having a plurality of data lines, the computer program product comprising a computer usable medium having computer readable program code thereon, the computer readable program code including:

program code for receiving the document data packets from the packet based portion of the network;

program code for storing data representing the document in a buffer;

program code for monitoring the total amount of data in the buffer; and program code for transmitting document data toward the receiving device across the network, the document data including additional data that is associated with the data lines of the document if the total amount of data in the buffer is less than a minimum amount of data.

47. The computer program product as defined by claim 46 wherein the document is transmitted from the transmitting device at a substantially constant rate, the document data being retrieved from the buffer and transmitted toward the receiving device at the substantially constant rate.

48. The computer program product as defined by claim 46 wherein the additional data comprises a copy of at least one of the data lines of the document.

49. The computer program product as defined by claim 46 wherein the additional data comprises fill data appended at least of the data lines of the document.

50. The computer program product as defined by claim 46 wherein the document is stored in the buffer as data lines.

51. The computer program product as defined by claim 50 wherein the data lines comprise scan lines of a facsimile document.

52. A method of controlling the effect of delay on a document transmitted across a network from a transmitting device to a receiving device, the network having a packet based portion that transmits the document as document data packets, the method comprising:

receiving the document data packets from the packet based portion of the network;

storing data representing the document in a buffer;

monitoring the total amount of data stored in the buffer;

changing the stored data in the buffer to produce changed document data if the total amount of data stored in the buffer is outside of a preselected size range, the size range having a maximum size and a minimum size; and transmitting, across the network, the changed document data toward the receiving device.

53. The method as defined by claim 52 wherein the total amount of data is less than the minimum size.

54. The method as defined by claim 53 wherein the document includes a plurality of lines, the changed document data including the plurality of lines and an additional line.

55. The method as defined by claim 53 wherein the document includes a plurality of lines, the changed document data including at least one of the plurality of lines with additional data.

56. The method as defined by claim 52 wherein the total amount of data is greater than the maximum size.

57. The method as defined by claim 56 wherein the document includes a set of lines, the changed document data including a subset of the set of lines.

58. The method as defined by claim 52 wherein the document includes a plurality of lines, the method further comprising:

reconstructing the data lines of the document, the data representing the document being stored in the buffer as the reconstructed data lines.

59. The method as defined by claim 52 wherein the data is transmitted from the transmitting device at a substantially constant rate, the changed document data being transmitted at the substantially constant rate.

60. An apparatus for controlling the effect of delay on a document transmitted across a network from a transmitting device to a receiving device, the network having a packet based portion that transmits the document as document data packets, the method comprising:

an input for receiving the document data packets from the packet based portion of the network;

a buffer that stores data representing the document;

a monitor operatively coupled with the buffer, the monitor monitoring the total amount of data stored in the buffer;

a data processor operatively coupled with the monitor, the data processor changing the stored data in the buffer to produce changed document data if the total amount of data stored in the buffer is outside of a preselected size range, the size range having a maximum size and a minimum size; and an output operatively coupled with the data processor, the output transmitting, across the network, the changed document data toward the receiving device.

61. The apparatus as defined by claim 60 wherein the total amount of data is less than the minimum size.

62. The apparatus as defined by claim 61 wherein the document includes a plurality of lines, the changed document data including the plurality of lines and an additional line.

63. The apparatus as defined by claim 61 wherein the document includes a plurality of lines, the changed document data including at least one of the plurality of lines with additional data.

64. The apparatus as defined by claim 60 wherein the total amount of data is greater than the maximum size.

65. The apparatus as defined by claim 64 wherein the document includes a set of lines, the changed document data including a subset of the set of lines.

66. The apparatus as defined by claim 60 wherein the document includes a plurality of lines, the apparatus further comprising:

a data module that reconstructs the data lines of the document, the data representing the document being stored in the buffer as the reconstructed data lines.

67. The apparatus as defined by claim 60 wherein the data is transmitted from the transmitting device at a substantially constant rate, the changed document data being transmitted at the substantially constant rate.

68. A computer program product for use on a computer system for controlling the effect of delay on a document transmitted across a network from a transmitting device to a receiving device, the network having a packet based portion that transmits the document as document data packets, the computer program product comprising a computer usable medium having computer readable program code thereon, the computer readable program code including:

program code for receiving the document data packets from the packet based portion of the network;

program code for storing data representing the document in a buffer;

program code for monitoring the total amount of data stored in the buffer;

program code for changing the stored data in the buffer to produce changed document data if the total amount of data stored in the buffer is outside of a preselected size range, the size range having a maximum size and a minimum size; and program code for transmitting, across the network, the changed document data toward the receiving device.

69. The computer program product as defined by claim 68 wherein the total amount of data is less than the minimum size.

70. The computer program product as defined by claim 69 wherein the document includes a plurality of lines, the changed document data including the plurality of lines and an additional line.

71. The computer program product as defined by claim 69 wherein the document includes a plurality of lines, the changed document data including at least one of the plurality of lines with additional data.

72. The computer program product as defined by claim 68 wherein the total amount of data is greater than the maximum size.

73. The computer program product as defined by claim 72 wherein the document includes a set of lines, the changed document data including a subset of the set of lines.

74. The computer program product as defined by claim 68 wherein the document includes a plurality of lines, the computer program product further comprising:

program code for reconstructing the data lines of the document, the data representing the document being stored in the buffer as the reconstructed data lines.

75. The computer program product as defined by claim 68 wherein the data is transmitted from the transmitting device at a substantially constant rate, the changed document data being transmitted at the substantially constant rate.

* * * * *